US009009152B2

(12) United States Patent
Lai et al.

(10) Patent No.: US 9,009,152 B2
(45) Date of Patent: Apr. 14, 2015

(54) SMART WIDGETS

(75) Inventors: Wei-Cheng Lai, Cupertino, CA (US); Su-Lin Wu, San Carlos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 337 days.

(21) Appl. No.: 12/700,572

(22) Filed: Feb. 4, 2010

(65) Prior Publication Data

US 2011/0191316 A1 Aug. 4, 2011

(51) Int. Cl.
*G06F 17/30* (2006.01)
*G06F 7/00* (2006.01)
*G06F 7/10* (2006.01)

(52) U.S. Cl.
CPC . *G06F 7/10* (2013.01); *G06F 17/30* (2013.01)

(58) Field of Classification Search
USPC .................................. 707/728, 732–734, 749
See application file for complete search history.

(56) References Cited

U.S. PATENT DOCUMENTS

| | | | | |
|---|---|---|---|---|
| 7,451,129 | B2 * | 11/2008 | Lamping et al. ...................... | 1/1 |
| 8,010,527 | B2 * | 8/2011 | Denoue et al. ................. | 707/726 |
| 8,065,683 | B2 * | 11/2011 | Sato et al. ...................... | 718/106 |
| 8,140,566 | B2 * | 3/2012 | Boerries et al. ............... | 707/769 |
| 8,230,037 | B2 * | 7/2012 | Story et al. .................... | 709/217 |
| 2007/0083520 | A1 * | 4/2007 | Shellen et al. .................. | 707/10 |
| 2007/0265905 | A1 * | 11/2007 | Lazier ............................. | 705/10 |
| 2008/0083003 | A1 * | 4/2008 | Biniak et al. ................... | 725/110 |
| 2009/0024944 | A1 * | 1/2009 | Louch et al. .................... | 715/765 |
| 2009/0037509 | A1 * | 2/2009 | Parekh et al. ................... | 709/201 |
| 2009/0249321 | A1 * | 10/2009 | Mandyam et al. .............. | 717/171 |
| 2010/0100512 | A1 * | 4/2010 | Brodin et al. ................... | 706/12 |
| 2010/0211894 | A1 * | 8/2010 | Jahr et al. ....................... | 715/762 |

OTHER PUBLICATIONS

Daniel Billsus and Michael Pazzani, Adaptive News Access, Published 2007, pp. 550-570.*
Daniel Billsus, David Hilbert and Dan Maynes-Aminzade, Improving Proactive Information Systems, IUI'05, Published 2005.*
Owen Phelan, Kevin McCarthy and Barry Smyth, Using Twitter to Recommend Real-Time Topical News, RecSys'09, published 2009.*
Daniel Billsus and Michael Pazzani, A Personal News Agent that Talks, Learns and Explains, AGENTS'99 Proceedings of the third annual conference on Autonomous Agents, published 1999, pp. 268-275.*

* cited by examiner

*Primary Examiner* — Jeffrey A Burke
(74) *Attorney, Agent, or Firm* — Berkeley Law & Technology Group, LLP

(57) ABSTRACT

According to some example embodiments, a method includes based, at least in part, on one or more signals representative of user-defined content, assessing the user-defined content and storing one or more signals representative of a result of the assessment of the user-defined content. The method further includes selecting one or more widgets for presentation in combination with other content associated with the user-defined content, the selecting being based at least in part on the assessment of the user-defined content.

20 Claims, 13 Drawing Sheets

FIG. 5

SMART WIDGETS

BACKGROUND

1. Technical Field

The subject matter disclosed generally relates to widgets that utilize user-defined content.

2. Description of the Related Art

Sponsored search is a large and rapidly growing advertising platform and a major source of revenue generated over the Internet by search engine companies. With a high volume of Internet searches performed every day, search results web pages may represent a commercially-viable advertising medium allowing advertisers to achieve complex advertising goals (e.g., build brand awareness, attract specific customers, target segmented markets, generate web traffic, implement behavioral targeting, etc.).

Many modern search engines may still implement user interfaces and software architectures that were popularized more than a decade ago. With these legacy interfaces and architectures, publicly accessible web pages may be crawled, analyzed, indexed, or deployed using thousands of machines. When a user submits a query to interact with such a legacy search engine, the search engine may analyze the query, select pages matching the query terms, rank the selected pages, then return a pre-determined number of the selected pages to the user. The search engine may summarize the returned pages with fragmented sentences and highlighted matching terms.

These search engine design choices may have been efficient when computer power was relatively limited and multimedia content was scarce, but they favored software efficiency over a quality of a user's search experience. Users are expected to read fragmented sentences that may not be organized in any recognizable structure. If the user is not satisfied with the returned results, most search engines may not offer much in the way of aid except for showing a few popular related queries. These search engines usually expect the correct syntax and vocabulary when a user submits a query. It is not surprising that when a user searches on an unfamiliar subject, she may feel lost or frustrated.

BRIEF DESCRIPTION OF THE FIGURES

Non-limiting and non-exhaustive example embodiments will be described with reference to the following figures, wherein like reference numerals refer to like parts throughout the various figures unless otherwise specified.

FIG. 5 is an example screenshot illustrating a set of widgets in accordance with some alternative embodiments.

DETAILED DESCRIPTION

Figure 1:
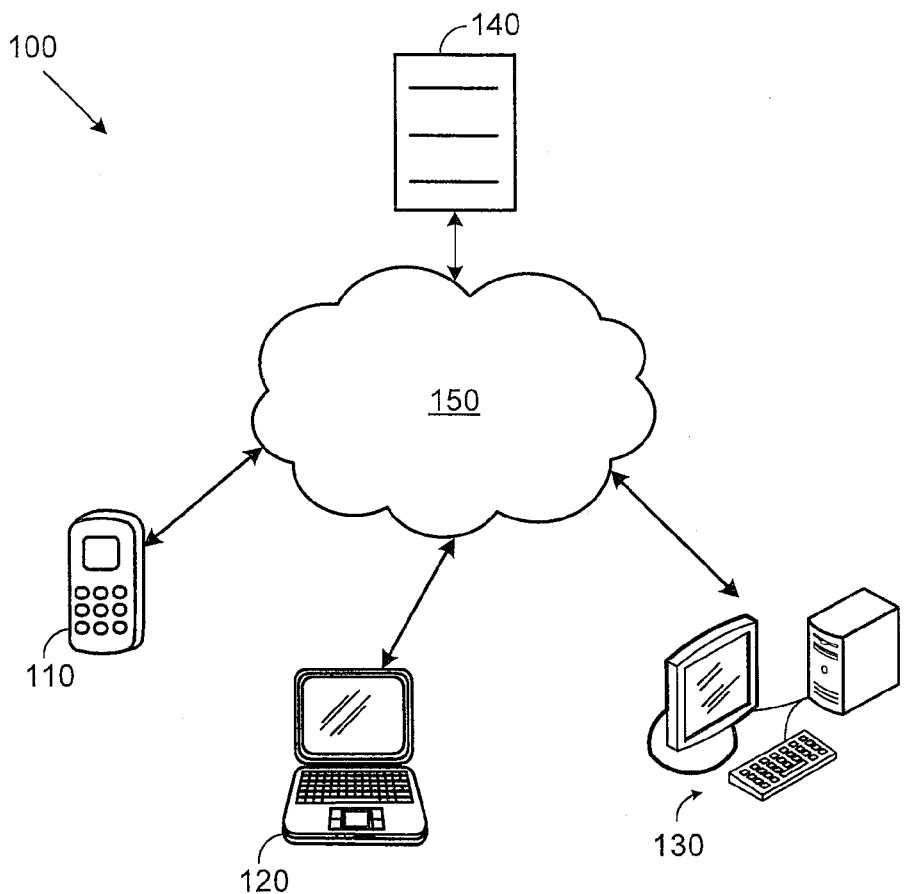
FIG. 1 is a schematic diagram of an example operating environment suitable for implementing example embodiments.

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some aspects of legacy search engine design and architecture that may negatively impact a quality of a user's search experience were described above. Since an amount of revenue that a search engine generates from sponsored search advertising may be directly related to a quality of a user's search experience, it may be beneficial to increase a quality of a user's search experience.

Accordingly, as Internet commerce evolves and computing power increases, it may be desirable to utilize user-defined content to provide more refined search options, solicit feedback from users, present more structured results, present more high-quality results that are protected by passwords, and/or personalize or tailor the user's search experience to generally enable a better search experience for the user while the user interacts with a search engine. At a higher level of abstraction, it may be desirable to utilize user-defined content to anticipate a user's intent and offer choices to the user that improve quality of the user's online experience.

As used herein, "User-Defined Content" (hereafter, "UDC") may refer to one or more signals representing any source code, search query, search result, advertisement, file, communication and/or data that may be rendered by a special purpose computing platform in response to a user input.

As a non-limiting illustration, UDC may include a web page, an e-mail message, an IM or text message, an Extensible Markup Language (XML) document, a media file (e.g., a graphical advertisement, etc.), and/or the like, and any combinations thereof. UDC may also include one or more embedded widgets or references (e.g., hyperlinks) to text, images, audio, video, and/or other web pages.

As used herein, a "widget" may refer to an element of a Graphical User Interface (hereafter, "GUI") that provides to a user of a special purpose computing platform an interaction point for manipulation of data. In particular embodiments, widgets may provide basic visual building blocks which, if combined in an application, access at least a subset of the data processed by an application and provide at least one way for a user to manipulate the subset of data. A widget may include, for example, a window, a text box, or a drop-down menu.

As used herein, a "special purpose computing platform" may refer to any type of electronic device capable of transmitting, displaying or presenting UDC to a user who is operating the electronic device. Thus, a special purpose computing platform may include, but is not limited to, a server, a mainframe computer having multiple access terminals or workstations, a desktop computer, a notebook or laptop computer, a hand-held wireless device, a pager, or a mobile telephone.

In particular embodiments, UDC may include, for example, a search query that is submitted by a user to a search engine, an email or text message that is received by the user or sent by the user, a web-log or "blog" entry that is published by the user, or a web page that is presented to the user in response to the user selecting a hyper-link or typing a web address in a web browser.

Before describing some example embodiments in greater detail, the sections below introduce certain aspects of an example operating environment, computing or otherwise, in which UDC may be used to anticipate a user's intent and offer choices to the user that improve quality of the user's online experience. It should be appreciated, however, that techniques provided herein and claimed subject matter is not limited to these example implementations. In addition, any implementations and/or configurations described herein as "example" are described for purposes of illustration and are not to be construed as preferred or desired over other implementations and/or configurations.

FIG. 1 is a schematic diagram of an example operating environment 100 suitable for implementing example embodiments. Operating environment 100 may include, but is not limited to, a number of special purpose computing platforms such as mobile device 110, laptop computer 120, desktop computer 130, and server 140. Special purpose computing platforms 110, 120, 130, 140 may communicate with one another via a network 150. Although not shown, network 150 may include network devices such as routers, hubs, modems, Ethernet ports, wireless routers, etc., that may be required to facilitate communication among special purpose computing platforms 110, 120 130, 140 over network 150. Network 150 may include, for example, a global packet-switched network such as the Internet or World Wide Web. Network 150 may alternatively include smaller private networks or Intranets, for example.

Considering the enormous amount of information available on the World Wide Web, it may be desirable for a user of mobile device 110, laptop computer 120, or desktop computer 130 to employ a search engine service that may be implemented by server 140 to help such a user locate and efficiently retrieve one or more web documents that may be of particular and/or possible interest to the user.

As a way of illustration, a user of mobile device 110 may submit or otherwise specify one or more search terms (e.g., a query) into a search engine that is implemented by the server 140 using a GUI that is included as part of the mobile device. In this case, the query submitted by the user may be considered UDC.

In response, mobile device 110 may receive from server 140 a web page that may include a set of search results listed in a particular order. A web page may then be displayed or presented to a user of mobile device 140 using the GUI. A user may subsequently access another particular web page by clicking on a hyperlink or other selectable tool embedded in or otherwise associated with such a web page.

According to example embodiments, a web page including a set of search results that are received from server 140 may also include one or more widgets that may be clicked by a user. As will be explained in greater detail below, according to example embodiments widgets may utilize UDC to increase a quality of the user's search experience.

As used in the present application, "click" or "clicking" may refer to a selection process made by any pointing device, such as, for example, a mouse, track ball, touch screen, keyboard, a laser pointer, a stylus, a touch-sensitive display, a microphone and voice-recognition software, or an ocular tracking system that detects and tracks the movement of a user's eyes to determine which area of a display screen the user's eyes are focused upon, or any other type of device operatively enabled to select one or more web documents, for example, within a search results web page via a direct or indirect input from a user. Thus, while this disclosure may at times for convenience refer to a process of a user selecting a widget or hyperlink as "clicking" or a user's selection of a widget or hyperlink as a "click," the disclosure is not strictly limited to selecting a widget or a hyperlink by clicking a button on a mouse.

As another illustration, a user of laptop computer 120 may decide to use laptop computer 120 to run an application such as a web browser, which when launched may display a predetermined web page. A particular predetermined web page may also be referred to as a home page. A user may subsequently access another particular web page by clicking on a hyperlink or other selectable tool embedded in or otherwise associated with a home page. A user's home page or other web pages accessed by a user may also be considered UDC.

Server 140 may be capable of monitoring a home page or other web pages that are accessed by a user. This may occur, for example, if server 140 was operated by a user's Internet Service Provider or ISP. According to other example embodiments, server 140 may insert one or more widgets into a web page that is viewed by a user. As will be explained in greater detail below, according to example embodiments these widgets may utilize UDC to increase a quality of a user's online experience.

Figure 2:
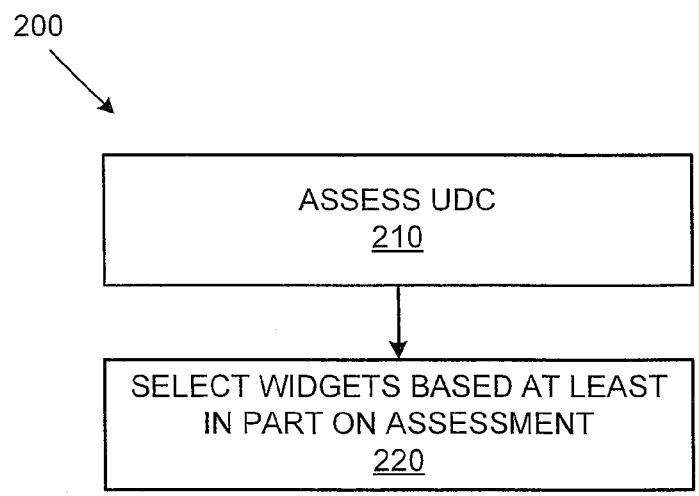
FIG. 2 is a flow diagram illustrating a method according to some example embodiments.

FIG. 2 is a flow diagram illustrating a method 200 according to some example embodiments. As illustrated, method 200 includes a particular number of process stages. However, it should be recognized that example embodiments may include additional process stages not included among the process stages illustrated in FIG. 2, and that such illustrated process stages may be common to many different example embodiments.

Method 200 begins with process 210, where UDC is assessed. As explained above, UDC may include search terms submitted to a search engine by a user. UDC may also include web pages that are viewed by a user based upon a user's inputs to a web browser. Additionally, UDC may include email, text, or Internet Messenger (IM) messages that are displayed to a user. Thus, the email, text, or IM messages may include, for example, messages that were authored by a user or messages that were authored by another and sent to a user.

According to some example embodiments, UDC may be assessed by a special-purpose computing platform such as, for example, server 140 of FIG. 1. In some embodiments, server 140 may be operated by an internet search engine. In other embodiments, server 140 may be operated by an ISP. In other alternative embodiments, server 140 may be operated by a web-based email provider.

An assessment of UDC may include a variety of tasks which may depend at least in part on a nature of particular UDC that is being assessed. For example, in a case where UDC includes a user-submitted search query that is submitted to a search engine, assessing such UDC may include parsing the search query using linguistic and semantic analysis to recognize any entity that is included in the query and estimate the user's query intent.

In a case where UDC includes a web page that is viewed by a user with the aid of a web browser, assessing the UDC may include extracting page titles, paragraph titles, and/or meta-descriptions of the web document. Assessing UDC may further include removing verbs and/or stop words to extract the subject terms. Resulting phrases may then be treated as a user's search query, and an intent of a user's query may be estimated.

In some cases UDC may include an email, text, or IM message. This situation may be handled in a similar manner as the case when UDC includes a web page. That is, assessment of the email, text, or IM message may include removing verbs and/or stop words in the body of message to extract subject terms. Extracted subject terms may then be treated as a user's search query and an intent of the user's query estimated.

Next, in process 220, one or more widgets may be selected based at least in part on an estimate of the user's intent that was arrived at as a result of assessing the UDC at process 210. Again, a widget selection process may be performed by a special-purpose computing platform, for example, a server 140 of FIG. 1. In some embodiments, a server 140 may select one or more widgets from a library of widgets that are maintained by the server. In other embodiments, a server 140 may select one or more widgets from widget libraries that are maintained by third-party sources. In still other embodiments, a server 140 may select one or more widgets from both local and third-party sources.

Server 140 may additionally determine how the selected widgets are to be rendered or displayed to a user. Ultimately, one or more selected widgets may be displayed to a user alongside other content that is associated with UDC. For example, suppose a user submits a search query that, based on the above-described process stages, results in three particular widgets being selected. Such selected widgets may then be rendered simultaneously and in conjunction with a traditional search results web page, which is typically in the form of a vertically-ordered list of results.

According to some embodiments, an order in which selected widgets are displayed to a user may also be controlled based upon one or more predetermined criteria. As used herein, an order of selected widgets may refer to a placement or position of a particular widget on a GUI relative to other widgets, if any. For example, in some embodiments widgets may be disposed in a vertical arrangement. Based upon at least one predetermined criteria, a widget that is estimated to be most desirable may be placed in a topmost position in a vertical arrangement, while a widget that is estimated to be the next most desirable widget may be placed in a position that is just below a widget in the topmost position of the vertical arrangement. Similarly, and in other embodiments, selected widgets may be disposed in a horizontal arrangement, with a most desirable widget according to at least one predetermined criteria placed in a position that is a left-most position relative to a user that is viewing such a horizontal arrangement of widgets.

According to example embodiments, one or more predetermined criteria used to determine an order in which selected widgets are displayed may include a content relevancy of a widget, a preference of a user, and a revenue potential of the widget.

As used herein, a content relevancy of a widget may refer to how closely a widget matches a deduced intent of a user's query. For example, suppose a user submits a query with terrors "Groom," "Lake," and "Nevada." Based on an assessment of this particular query, further suppose that three widgets are selected for rendering alongside a vertical search result web page. In one particular example, such widgets may include a mapping widget allowing a user to obtain driving directions from a selected spot to Groom Lake, Nev.; a tourism widget containing a list of attractions and sight-seeing stops in relatively close proximity to Groom Lake, Nev.; and an informational widget for the United States Air Force. Based on a history of similar searches previously submitted by other users, the informational widget for the United States Air Force may be emphasized or rendered more prominently compared to the mapping widget or the tourism widget.

Such emphasis upon one or more particular widgets compared to the other selected widgets may be accomplished in a variety of ways. For example, selected widgets may be ordered as discussed above. Additionally, one or more selected widgets may be rendered in a different color and/or rendered in a larger physical size compared to other selected widgets.

As used herein, a preference of a user for a widget may refer to a frequency at which a user has selected a given widget in the past. For example, continuing with the three example widgets that were described above, if it is known that a particular user selects a mapping widget over any other sort of widget at least 50% of the time that the user is presented with a choice between a mapping widget and another widget besides a mapping widget, then according to example embodiments a mapping widget may consistently be rendered more prominently (e.g., appearing first in a horizontally or vertically arranged group of widgets) than other widgets for that particular user.

As used herein, a revenue potential of a widget may refer to how much revenue a widget may generate for an entity (e.g., search engine, ISP, or web-based email provider) that operates a server 140. As discussed above, a server 140 may select widgets from among a library of widgets that is maintained and/or controlled by server 140. Widgets that are maintained and/or controlled by server 140 may be said to be "native" relative to an entity that operates server 140. Alternatively or in addition to native widgets, server 140 may also select from among third-party widgets that are developed, maintained, and/or owned by a third-party entity other than an entity that operates server 140. An entity that operates server 140 may agree with a third-party entity to render a selected number of third-party widgets in conjunction with its native widgets in exchange for a payment. A relatively small payment may be due from a third-party entity based upon, for example, a user selecting a third-party widget that is rendered by server 140. Native widgets may themselves not directly generate revenue for an entity that operates a server 140 when they are selected by a user, but selection of such a native widget may itself direct a user to other UDC (e.g., search results) that do provide revenue for an entity. Statistics regarding the performance of a particular widget, either third-party or native, may be kept over time to develop records of how much revenue is generated by such a widget per unit time. In particular embodiments, these records may then be used to determine a relative ranking of selected widgets.

In the following paragraphs, a description of a system architecture in accordance with example embodiments is presented. The described system architecture may be suited for implementing, among other things, process stages illustrated and described in conjunction with FIG. 2. The described system architecture may also be suited for implementing, among other things, server 140 of FIG. 1. The described system architecture is presented using functional blocks or modules, and those of skill in the art will recognize that the described functional modules may be implemented with software, firmware, hardware, or combinations of the same. Furthermore, it should be understood that this is merely an example system architecture presented for the purposes of discussing a particular embodiment, and that claimed subject matter is not limited in this respect.

Figure 14:
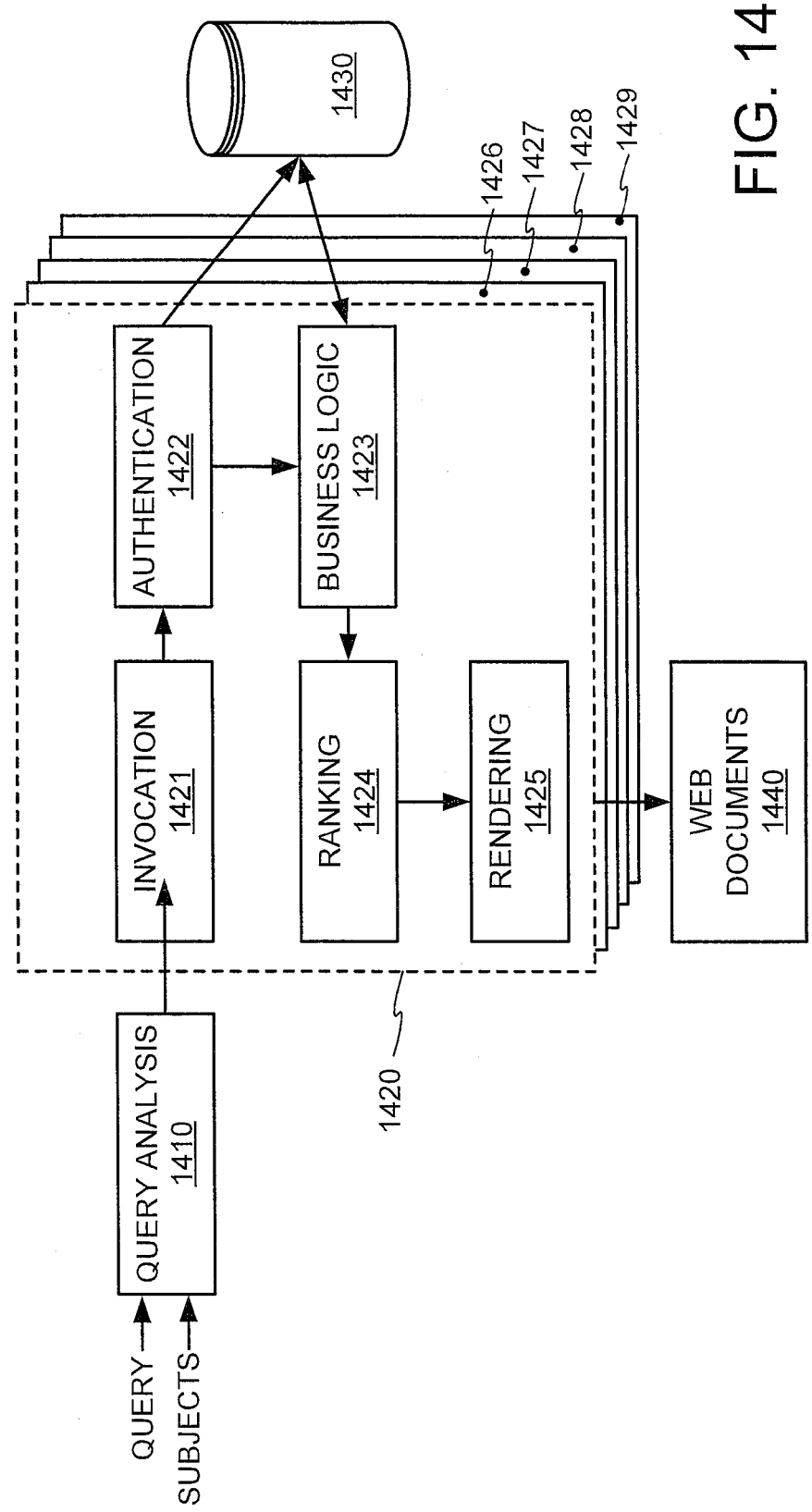
FIG. 14 is a schematic diagram illustrating a system architecture in accordance with example embodiments.

FIG. 14 is a schematic diagram illustrating a system architecture 1400 in accordance with example embodiments. As illustrated, system architecture 1400 may include a query analysis module 1410 and a widget container 1420. Widget container 1420 may itself include a number of modules, such as an Invocation module 1421, an Authentication module 1422, a Business Logic module 1423, a Ranking module 1424, and a Rendering Module 1425. Widget container 1420 may also include a session manager module 1426, a transaction manager module 1427, a security manager module 1428, and a logging module 1429.

Query analysis module 1410 may receive as input both user-generated queries (e.g., search queries that a user submits to a search engine) and subject terms that are extracted from web pages that are displayed to a user. Using these inputs, query analysis module 1410 may perform an entity recognition function where names, organizations, locations, and/or products may be extracted from a submitted query. Query analysis module 1410 may perform an entity recognition function by matching a sequence of query terms against a pre-built name dictionary to extract an entity. Query analysis module 1410 may also perform an entity recognition function by matching a pattern of query terms against a pre-built pattern dictionary to extract an entity. Query analysis module 1410 may also perform an entity recognition function by employing a machine-learned model that is capable of recognizing an entity in a query. Query analysis module 1410 may also perform an intent-recognition function on the user-generated query if a user's web activity history is available. Query analysis module 1410 may perform an intent-recognition function by pattern matching a user's query against a sequence of queries. Query analysis module 1410 may also perform an intent-recognition function by employing a machine-learned model that uses a user's previously submitted queries and click activity as inputs for deducing the user's intent.

Outputs of query analysis module 1410 may comprise a user's query itself, any entity tags that query analysis module has found, and/or any query intent tags expressing a deduced intent. These outputs may then be sent to widget container 1420 for further processing.

In particular, outputs from query analysis module 1410 may be sent to invocation module 1421 of the widget container 1420. A widget developer may specify conditions under which a widget is to be triggered. These conditions may be embodied in a query dictionary, a pattern dictionary, or both, for example. A query dictionary may specify one or more queries that are sufficient to a trigger a particular widget. A pattern dictionary may specify one or more entity tags, one or more query intent tags, or a combination of both that are sufficient to trigger a particular widget. By comparing outputs of query analysis module 1410 against a query dictionary or a pattern dictionary, an invocation module 1421 may determine which particular widgets should be used. Invocation module 1421 may also employ a machine-learned model that determines a widget's triggering condition. The output of invocation module 1421 may specify one or more widgets that are to be triggered.

Authentication module 1422 of widget container 1420 may interface with a vertical engine 1430 that may request a user supply a login to obtain access to a service associated with such vertical engine. In such a case, authentication module 1422 may also cache a user's credentials with a vertical engine 1430 in order to avoid repetitive login.

Business logic module 1423 may define what functions a widget is to perform when it is selected by a user as well as define a widget's user interface, for example, a drop-down menu or one or more selection buttons. Depending on a widget's access rights, business logic module 1423 may access the granted Application Programming Interfaces (hereafter, "APIs") offered by the underlying system.

In particular, business logic module 1423 may tailor a widget based on a user's inputs, a user's profile, or a user's web activity. If a user's click history and profile are available, business logic module 1423 may pre-fill a search box or pre-select a search option for a user. Additionally or alternatively, business logic module 1423 may determine which search options, questions, or dialog to display in a widget. Business logic module 1423 may achieve this tailoring using a set of pre-defined user patterns. For example, business logic module 1423 may select a particular search option if a user is male, and may select another particular search option if a user is female. Alternatively, business logic module 1423 may achieve this tailoring using a real-time model capable of capturing more sophisticated and dynamic user behavior.

Business logic module 1423 may additionally specify a preview content of a widget. That is, business logic module 1423 may specify which data, if any, is to be displayed if a user causes a cursor to pass over a particular widget without actively selecting the particular widget.

Business logic module 1423 may additionally specify which, if any, selections, worksheets, calculators, or other relevant information from vertical engine 1430 are to be displayed by a widget. In a case where vertical engine 1430 is associated with a password protected site, a business logic module 1423 may serve privileged contents from the vertical engine 1430. For example, a social search widget designed to search for people may show matches from a password protected site (e.g., Facebook or LinkedIn.) In addition, a business logic module 1423 may reformulate or rephrase a user's query to form a new query to be submitted to a vertical engine 1430.

Ranking module 1424 of widget container 1420 may rank activated widgets according to a user preference of a widget and/or a content relevance of a vertical search result with respect to an associated query. For example, a user may specify explicitly (e.g., via a user-populated profile) or implicitly (e.g., via a user's past history) a preference for a mapping widget relative to a shopping widget. As another example, a user may explicitly specify (e.g., via a user-populated profile) that selected widgets are to be placed in alphabetical order.

A ranking module 1424 may use a machine-learned model to predict a content relevance of a result that would be returned by a widget with respect to an associated query. A machine-learned model may use training examples that are collected through supervised and/or unsupervised learning. For example, supervised learning may include sending some random sampled queries to a widget for the resulting documents. The relevance of resulting <query, document> pairs may be judged manually (e.g., by a person) and used as training examples for the machine-learned model. Unsupervised learning may include collecting query sessions where a widget was clicked and its results consumed. Information obtained from such collecting may include, for example, a query, a widget click, widget results obtained as a result of a user click on a query, and a frequency at which obtained widget results were selected by users. Such information may reflect a relevance of widget results as perceived by actual users, which can then be used as training examples for the machine-learned model.

A rendering module 1425 of widget container 1420 may render the HTML, XTML, DHTML, javascript, or dom codes of the activated widgets and integrate them in a web document such as, for example, in a Search Engine Result Page (SERP). The look and formatting of a SERP may be controlled by a few Cascading Style Sheets (CSS) files. Thus, it may be preferable for the widget font, widget size, and widget color to also be determined by the CSS files. According to some embodiments, widgets may not be rendered with embedded scripts in order to avoid performance degradation and security loopholes. An output of rendering module 1425 may comprise a result page or a web document 1440 that is capable of being displayed to a user.

A session manager module 1426 of widget container 1420 may manage a user profile, a user session, and a user browsing activity. This may be accomplished by utilizing a browser cookie. A widget may access user session data through communication with a session manager module 1426. User session data may be useful for tailoring a widget to a particular user's needs and deducing a user's query intent.

A transaction manager module 1427 of widget container 1420 may manage a user-initiated transaction with a third-party server. For example, a user may select a "buy" button on a widget to purchase a product or a service. Transaction manager 1427 may enforce an all-or-nothing operation on a vertical engine. That is, transaction manager module 1427 may interact with a third-party server to ensure that a user transaction is completed. If a third-party server returns a failure on a user transaction, transaction manager module 1427 may roll back or remove all transaction-related activity from a widget.

A security manager module 1428 of widget container 1420 may monitor any abnormal or malicious activity on activated widgets. Security manager module 1428 may also control an access domain for one or more activated widgets. Security manager module 1428 may accomplish these tasks by implementing an access control mechanism. For example, such an access control mechanism may include tracking and enforcing access rights on data and communication for each widget. Such an access control mechanism may also include tracking and administrating any server that a widget connects to, as well as restricting user data that is to be transmitted to a third-party server.

A logging module 1429 of a widget container 1420 may log widget activities and user activities. For example, logging module 1429 may log widget actions such as data access and remote communication. Logging module 1429 may additionally log a user inputs and clicks. These logged data may be used, for example, to improve content relevance, to understand user query intent, and to detect ill-behaved widget activity or other abnormal activity.

Next, in the paragraphs presented below, some specific examples of widgets in accordance with numerous example embodiments are described and explained with reference to accompanying figures. Those of skill in the art will recognize that these example widgets are just a few of the myriad variety of widgets that may be implemented in accordance with the teachings found herein.

Figure 3:
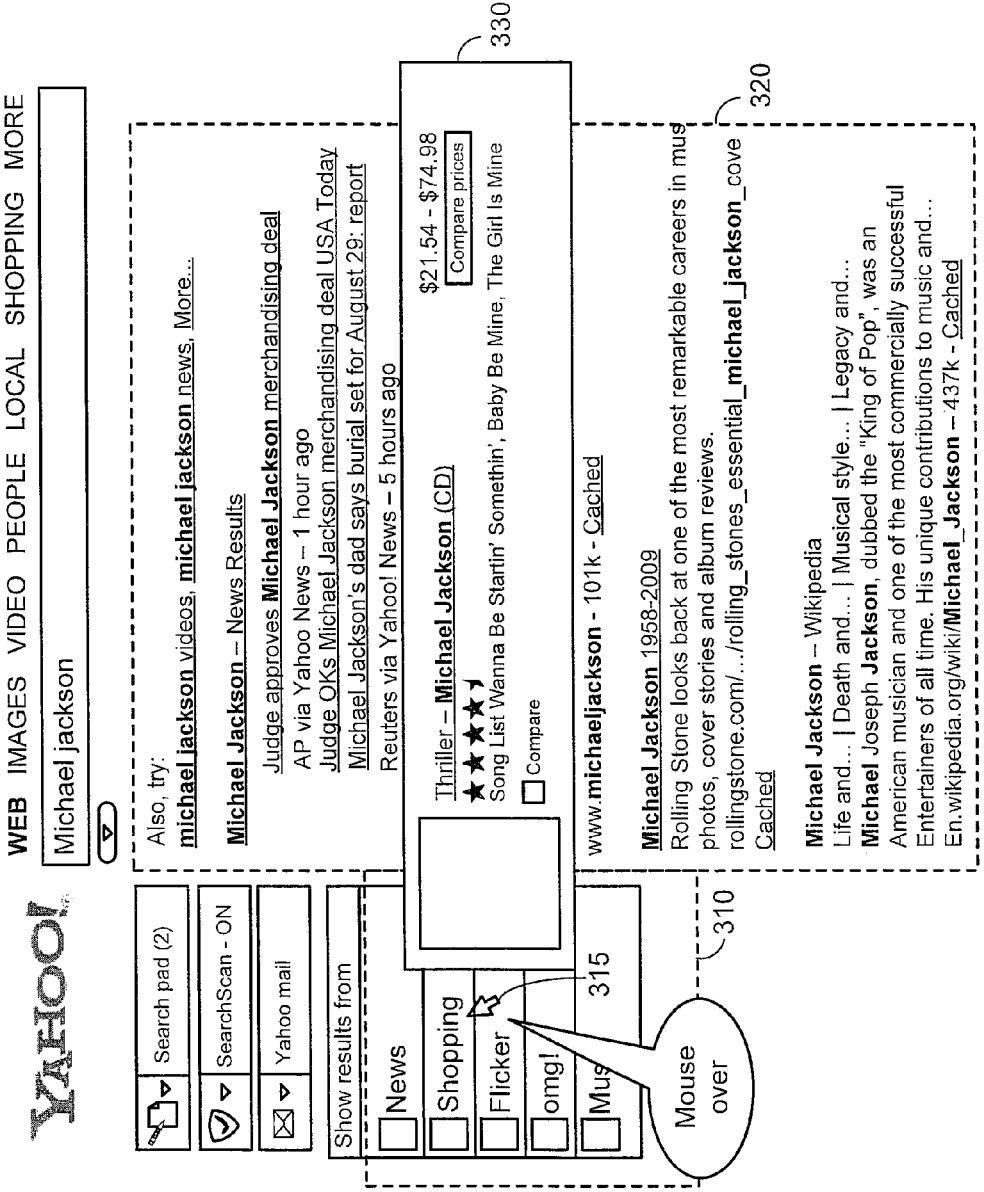
FIG. 3 is an example screenshot illustrating a set of widgets in accordance with some embodiments.

FIG. 3 is an example screenshot 300 illustrating a set of widgets 310 in accordance with some embodiments. Screenshot 300 includes web search results 320 that may be returned in response to a user submitting a search on the query "michael jackson." Additionally, screenshot 300 includes a set of widgets 310 in accordance with an example embodiment. There are five different widgets 310, which may be selected and displayed alongside the web search results 320 in accordance with the techniques that were described above. The widgets 310 are labeled "News," "Shopping," "Flickr," "omg!," and "Music." As a user mouses over, clicks, or otherwise selects one of the widgets 310 with the mouse 315, additional search results related to the particular labeled widget may be displayed within the pop-up box 330. The illustrated case shows that if a user selects the shopping widget, one result may be that pop-up box 330 displays one of Michael Jackson's albums and a best available price for that album.

Figure 4:
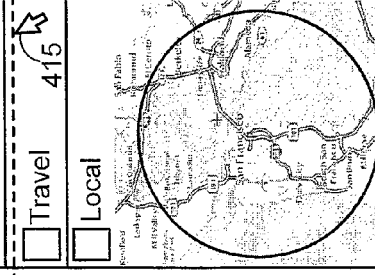
FIG. 4 is an example screenshot illustrating a set of widgets in accordance with some other embodiments.

FIG. 4 is an example screenshot 400 illustrating a set of widgets 410 in accordance with some other embodiments. Screenshot 400 includes web search results 420 that may be returned in response to a user submitting a search on the query "sf zoo." Additionally, screenshot 400 includes a set of widgets 410 in accordance with an example embodiment. There are two different widgets 410, which may be selected and displayed alongside web search results 420 in accordance with the techniques that were described above. Widgets 410 are labeled "Travel" and "Local." If a user selects widgets 410 with cursor 415, additional search results related to a particular labeled widget may be displayed within pop-up box 430. The illustrated case shows that if a user selects travel widget 410, one result may be that pop-up box 430 displays some additional relevant information regarding the San Francisco Zoo.

Figure 5:
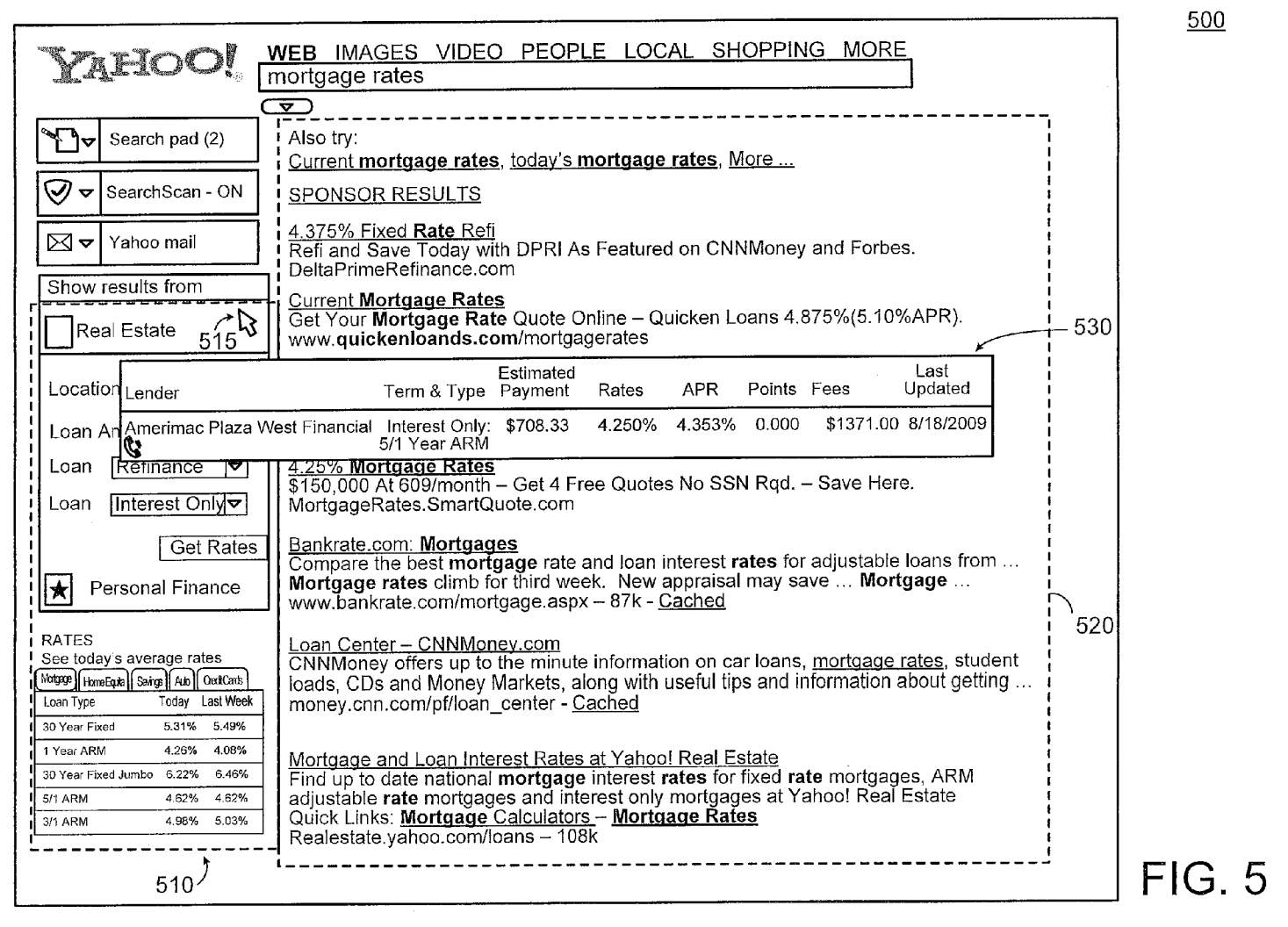

FIG. 5 is an example screenshot 500 illustrating a set of widgets 510 in accordance with some other embodiments. Screenshot 500 includes web search results 520 that may be returned in response to a user submitting a search on the query "mortgage rates." Additionally, screenshot 500 includes a set of widgets 510 in accordance with an example embodiment. There are two different widgets 510, which may be selected and displayed alongside web search results 520 in accordance with the techniques that were described above. Widgets 510 are labeled "Real Estate" and "Personal Finance." If a user selects one of widgets 510 with cursor 515, handy utilities and calculators may be displayed. For example, the illustrated case shows that if a user selects a real estate widget, one result may be that pop-up box 530 highlights a best currently available mortgage rate. The illustrated case also shows that a personal finance widget may, without an associated selection by a user, automatically display current rates for different types of loans.

Figure 6:
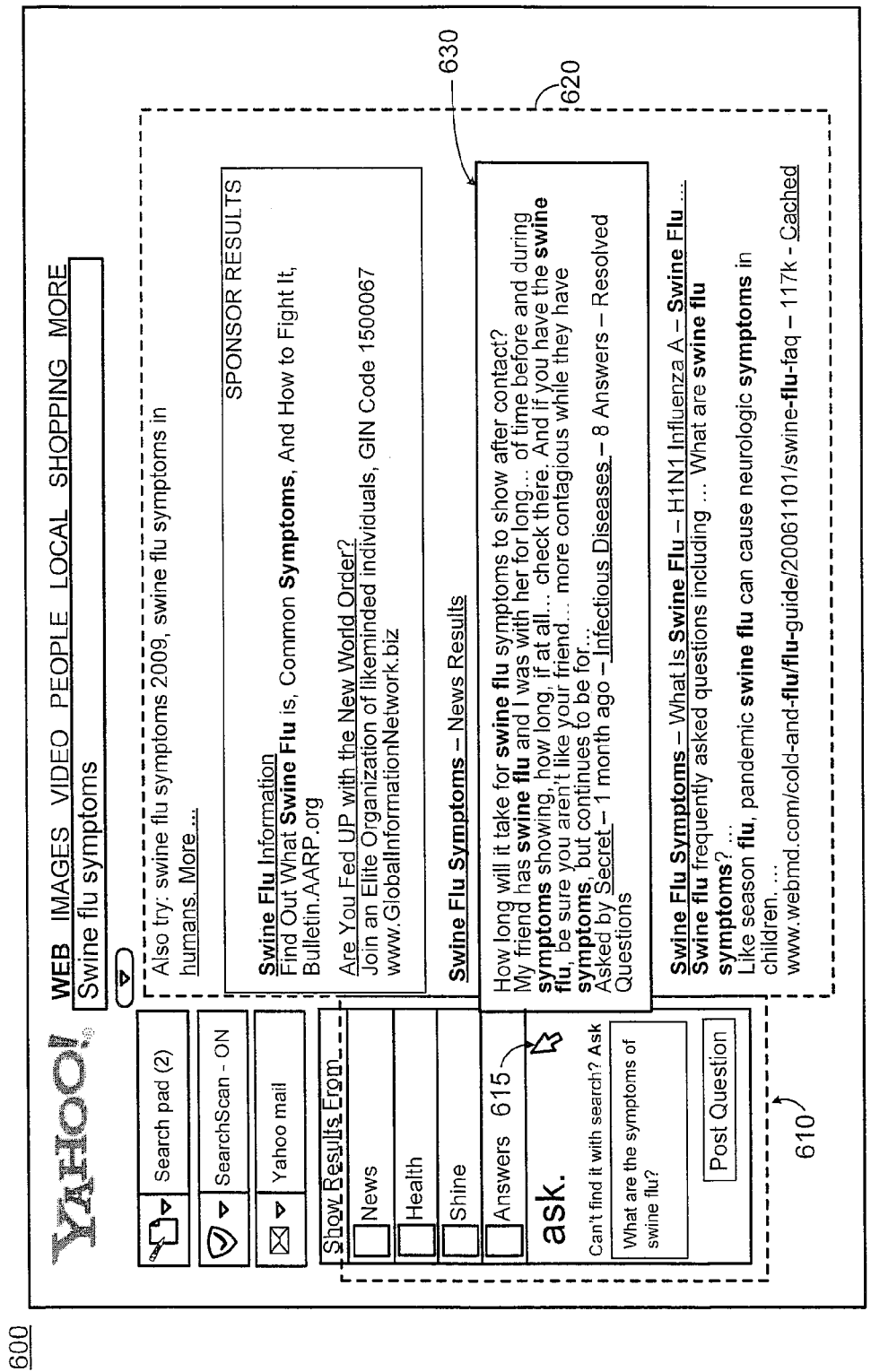
FIG. 6 is an example screenshot illustrating a set of widgets in accordance with some additional embodiments.

FIG. 6 is an example screenshot 600 illustrating a set of widgets 610 in accordance with some other embodiments. Screenshot 600 includes web search results 620 that may be returned in response to a user submitting a search on the query "swine flu symptoms." Additionally, screenshot 600 includes a set of widgets 610 in accordance with an example embodiment. There are five different widgets 610, which may be selected and displayed alongside the web search results 620 in accordance with the techniques that were described above. Widgets 610 are labeled "News," "Health," "Shine," "Answers," and "Ask." If a user selects Answers widget 610 with cursor 615, a question that was asked by another user regarding swine flu symptoms may be highlighted in pop-up box 630.

Screenshot 600 illustrates another useful aspect of some example embodiments. In screenshot 600, a third-party widget 610 is labeled as "Ask." As used herein, a third-party widget may refer to a widget whose content is not controlled by an owner of a web page where the widget appears. Such an Ask widget may allow a user to post a question to the third-party site. Outsourcing certain utilities or specialized search capabilities to third-party sites in this manner may provide an additional source of revenue to the owner of a web page.

Figure 7:
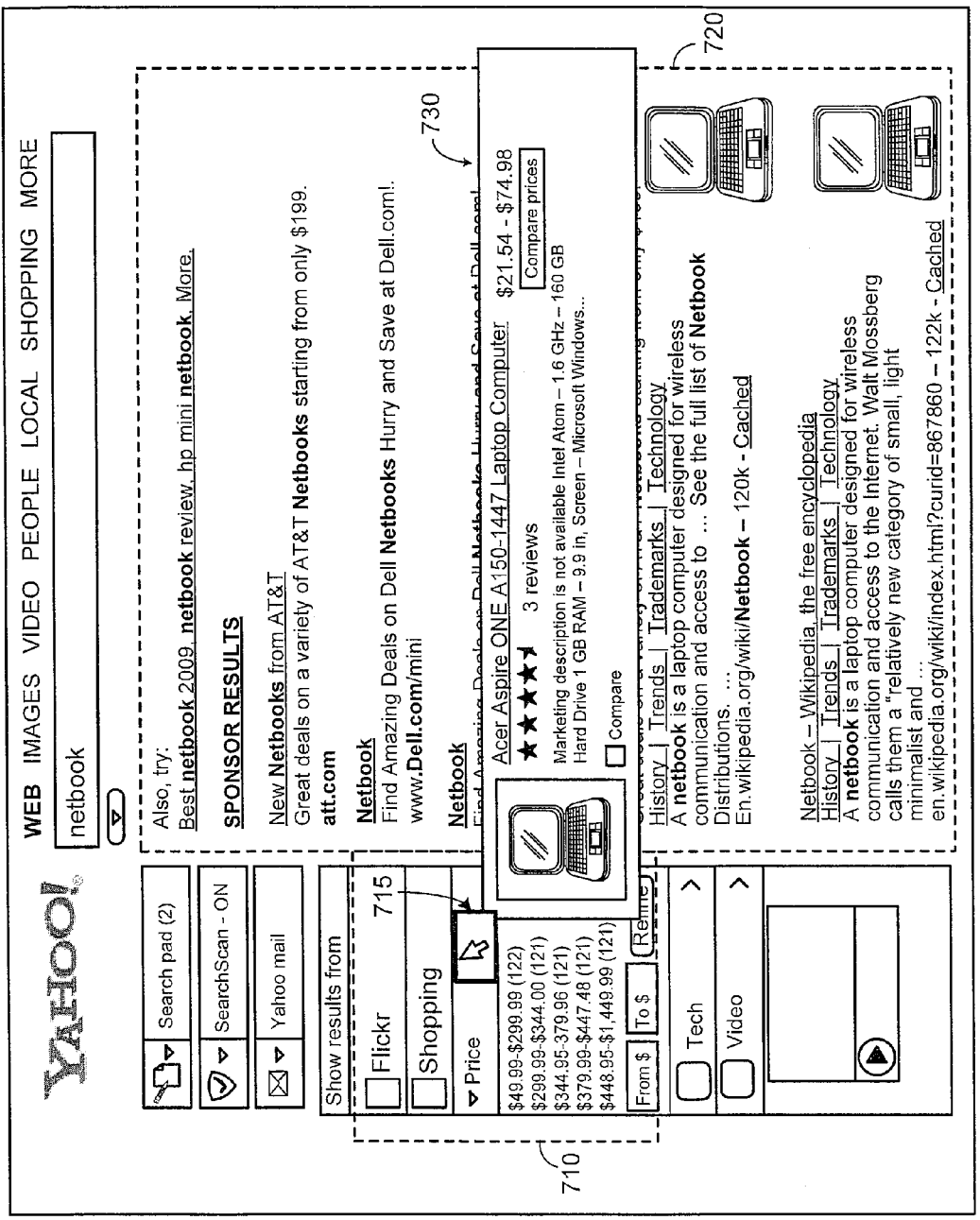
FIG. 7 is an example screenshot illustrating a set of widgets in accordance with some embodiments.

FIG. 7 is an example screenshot 700 illustrating a set of widgets 710 in accordance with some embodiments. Screenshot 700 includes web search results 720 that may be returned in response to a user submitting a search on the query "netbook." Additionally, screenshot 700 includes a set of widgets 710 in accordance with an example embodiment. There are four different widgets 710, which may be selected and displayed alongside web search results 720 in accordance with the techniques that were described above. Widgets 710 are labeled "Flickr," "Shopping," "Tech," and "Video."

Screenshot 700 illustrates that, according to some embodiments, widgets 710 may include one or more "drill-down" widgets. An example of a drill-down widget is illustrated in screenshot 700 by the Shopping widget, which shows that if a user selects a Shopping widget using cursor 715, such a Shopping widget may provide a number of input boxes allowing a user to directly input additional desired details for a netbook, such as a user's desired price for a netbook. Thus, according to some embodiments a widget may directly seek or prompt input from a user in order to obtain more precise search results. As a user selects the shopping widget with cursor 715, a pop-up box 730 may also show additional information regarding selected netbooks.

Figure 8:
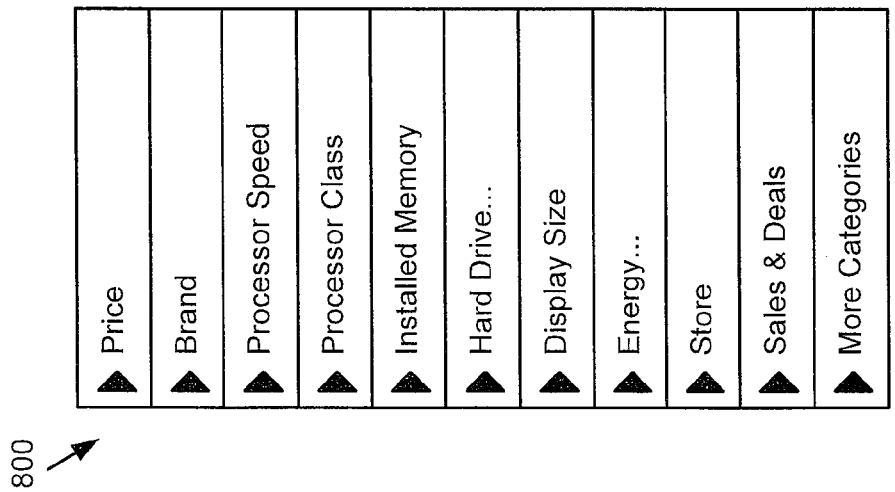
FIG. 8 is a diagram that further illustrates a widget according to an example embodiment.

FIG. 8 is a diagram that further illustrates a drill down widget 800 according to an example embodiment. In addition to price, a drill down widget 800 may include numerous other criteria including brand, processor speed, processor class, etc., which allow a user to further refine their search criteria. Other drill-down widgets according to other embodiments may include more or less criteria than drill-down widget 800.

Figure 9:
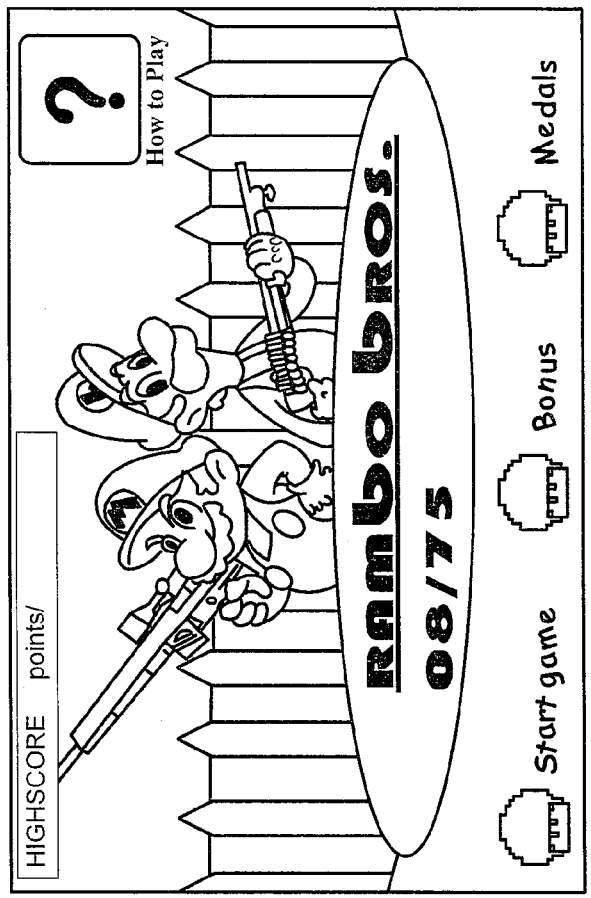
FIG. 9 is a diagram that illustrates a flash game widget according to an example embodiment.

FIG. 9 is a diagram that illustrates a flash game widget 900 according to an example embodiment. According to these embodiments, if a user submits a game-related query to a search engine such as, for example, "Super Mario," one or more of selected widgets may be a flash game widget such as flash game widget 900. A user's subsequent selection of flash game widget 900 may prompt flash game widget to present video and audio media that is representative of an actual game that a user is considering purchasing. Thus, a widget such as flash game widget 900 may allow a user to preview one or more aspects of a game that she is considering purchasing.

Figure 10:
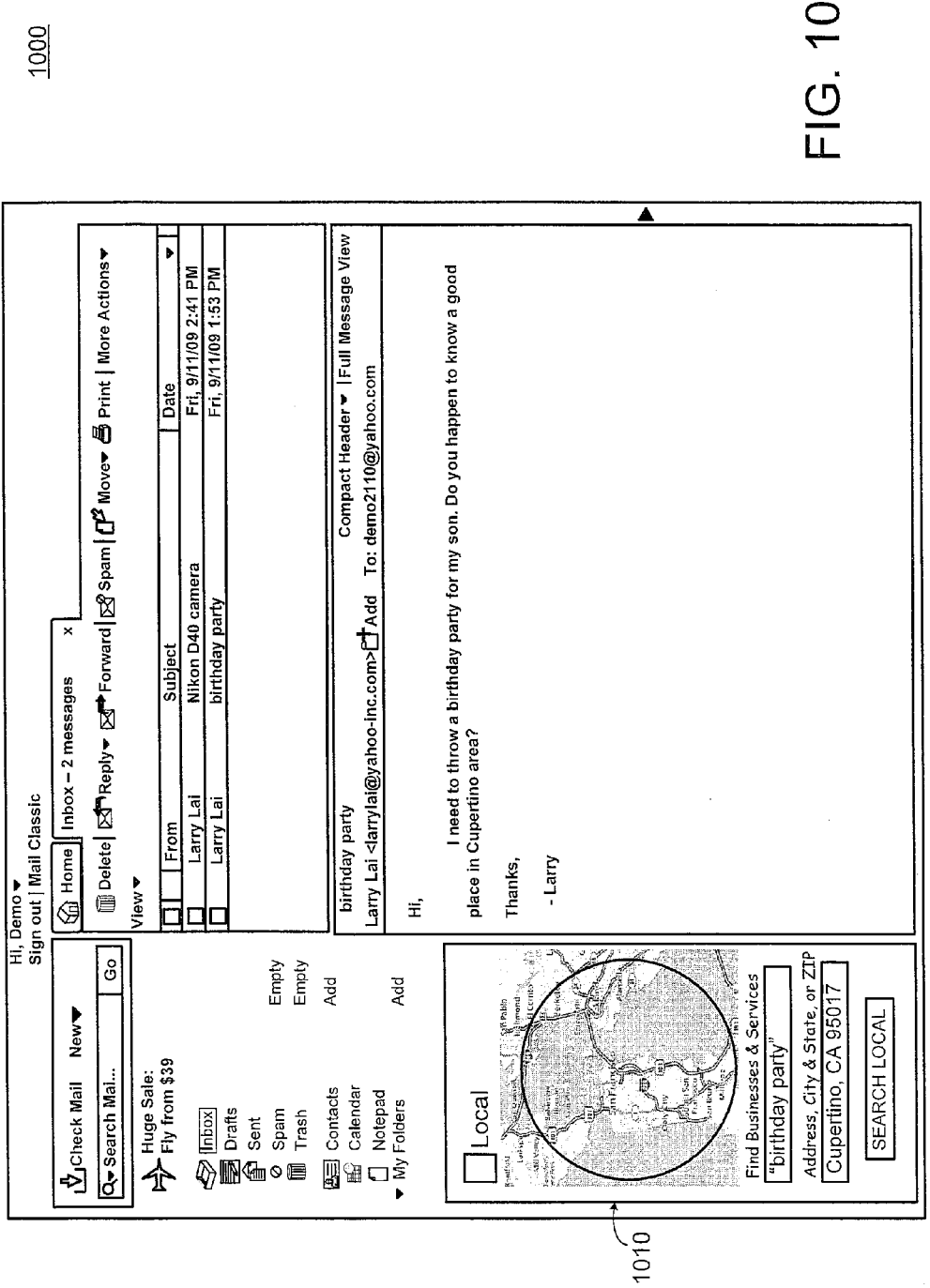
FIG. 10 is an example screenshot illustrating a widget in accordance with some alternative embodiments.

FIG. 10 is an example screenshot 1000 illustrating a widget 1010 in accordance with some alternative embodiments. Screenshot 1000 illustrates that a user may invoke a web-based email application. Screenshot 1000 further illustrates that as a user selects an email from his inbox, a Local widget 1010 may be rendered in conjunction with a web-based email application. UDC that is assessed prior to selecting a Local widget 1010 and rendering a Local widget in accordance with techniques described above may be a subject line of a user's selected email. For example, in the illustrated case, UDC that is assessed prior to selecting a Local widget 1010 comprises a subject line of a user's selected email, which is "birthday party."

As illustrated, Local widget 1010 may also display personal information associated with a user, such as a user's address, city, state, and/or zip code. This information may be provided by a user upon establishing an account with a web-based email application. Use of a user's personal information in this manner may allow a Local widget 1010 to anticipate the needs of a user and tailor a user's online experience based at least in part upon an anticipated need of a user.

Figure 11:
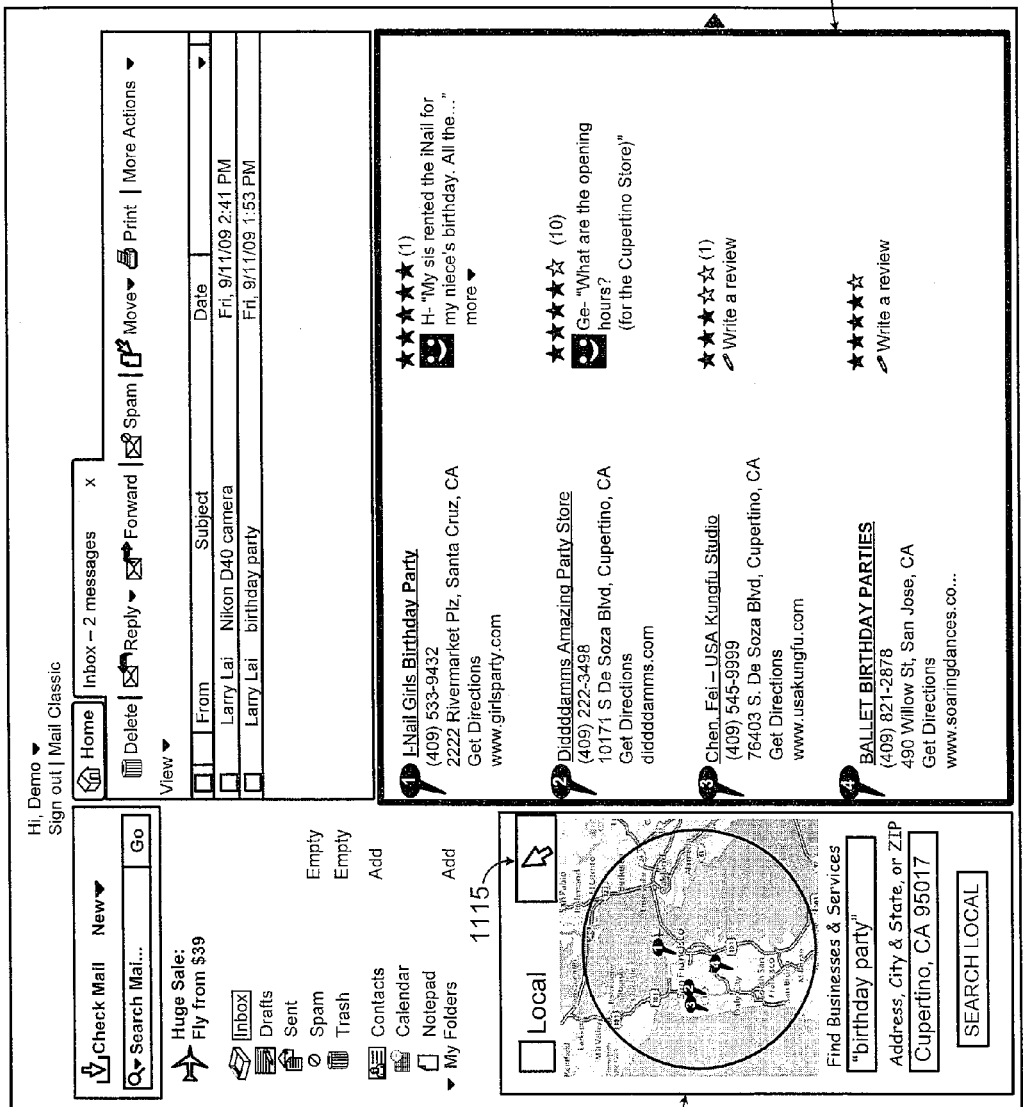
FIG. 11 is an example screenshot further illustrating a widget of FIG. 10 in accordance with example embodiments.

FIG. 11 is an example screenshot 1100 further illustrating a widget 1010 in accordance with example embodiments. Screenshot 1100 illustrates that if a user selects a Local widget 1010 using a cursor 1115, a pop-up box 1110 may be rendered that displays relevant results from a search that is performed by Local widget 1010. This may allow a user to preview relevant search results and decide whether a search query that is currently specified by Local widget 1010 is actually a search query that a user desires.

Figure 12:
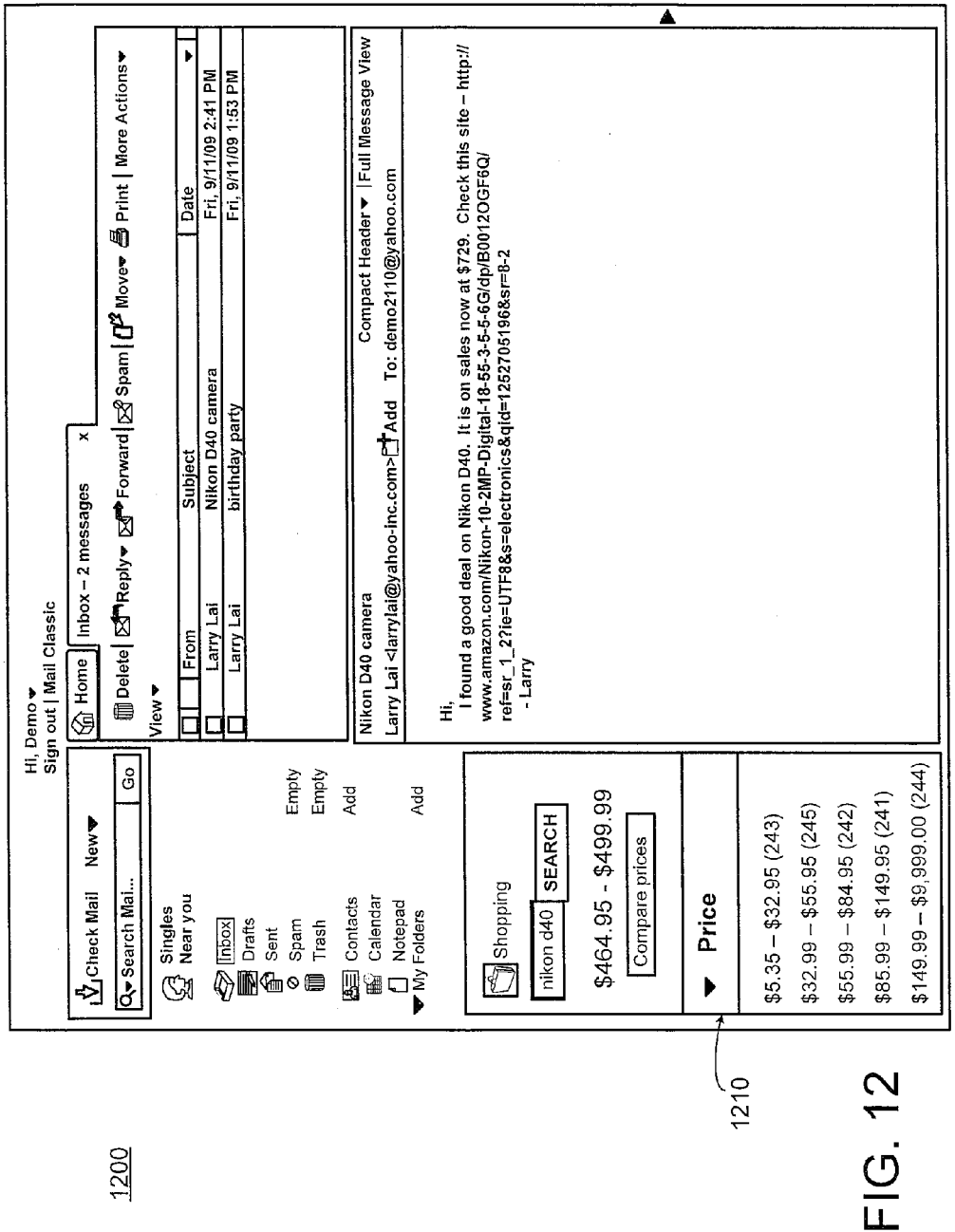
FIG. 12 is an example screenshot illustrating a widget in accordance with other example embodiments.

FIG. 12 is an example screenshot 1200 illustrating a widget 1210 in accordance with other example embodiments. Screenshot 1200 illustrates that a user may invoke a web-based email application to read contents of an email message that is selected from a user's inbox. Screenshot 1200 further illustrates that as a user selects and displays contents of such a selected email message, a Shopping widget 1210 may be rendered in conjunction with a web-based email application. In this case, UDC that is assessed prior to selecting a Shopping widget 1210 and rendering a Shopping widget in accordance with techniques described above may comprise a subject of a selected email message (e.g., "Nikon D40 camera") and a content of a selected email message (e.g., "Hi, I found a good deal on Nikon D40. It is on sales now at $729. Check this site"). Shopping widget 1210 may be similar to other widgets that were described above and so will not be explained in further detail here.

Figure 13:
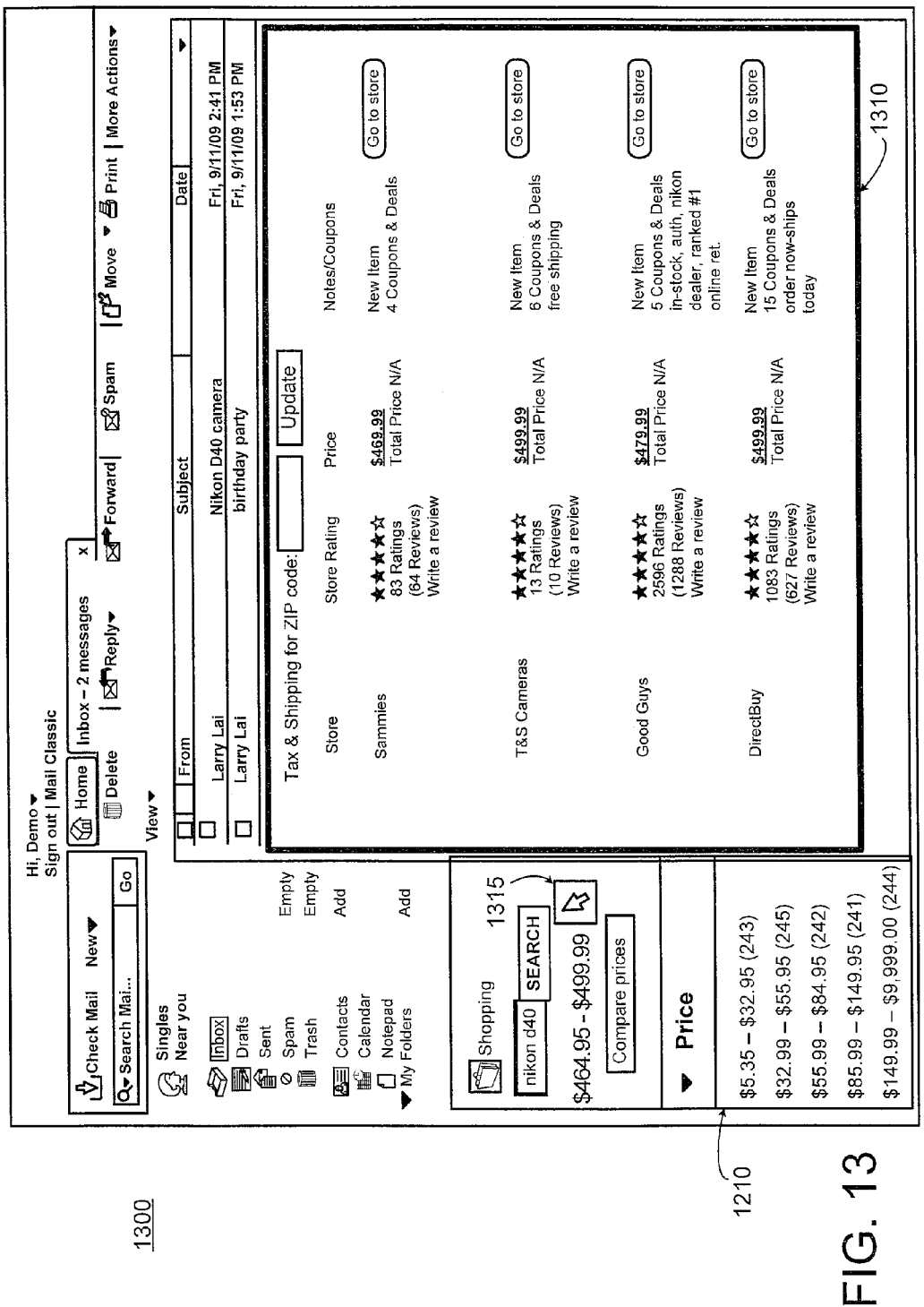
FIG. 13 is an example screenshot further illustrating a widget of FIG. 12 in accordance with example embodiments.

FIG. 13 is an example screenshot 1300 further illustrating widget 1210 of FIG. 12 in accordance with example embodiments. Screenshot 1300 illustrates that as a user selects a Shopping widget 1210 using a cursor 1315, a pop-up box 1310 may be rendered that displays relevant results from a search that is performed by a Shopping widget 1210. This may allow a user to preview relevant search results and decide whether a search query that is currently specified by a Shopping widget 1210 is actually a search query that a user desires.

Figure 15:
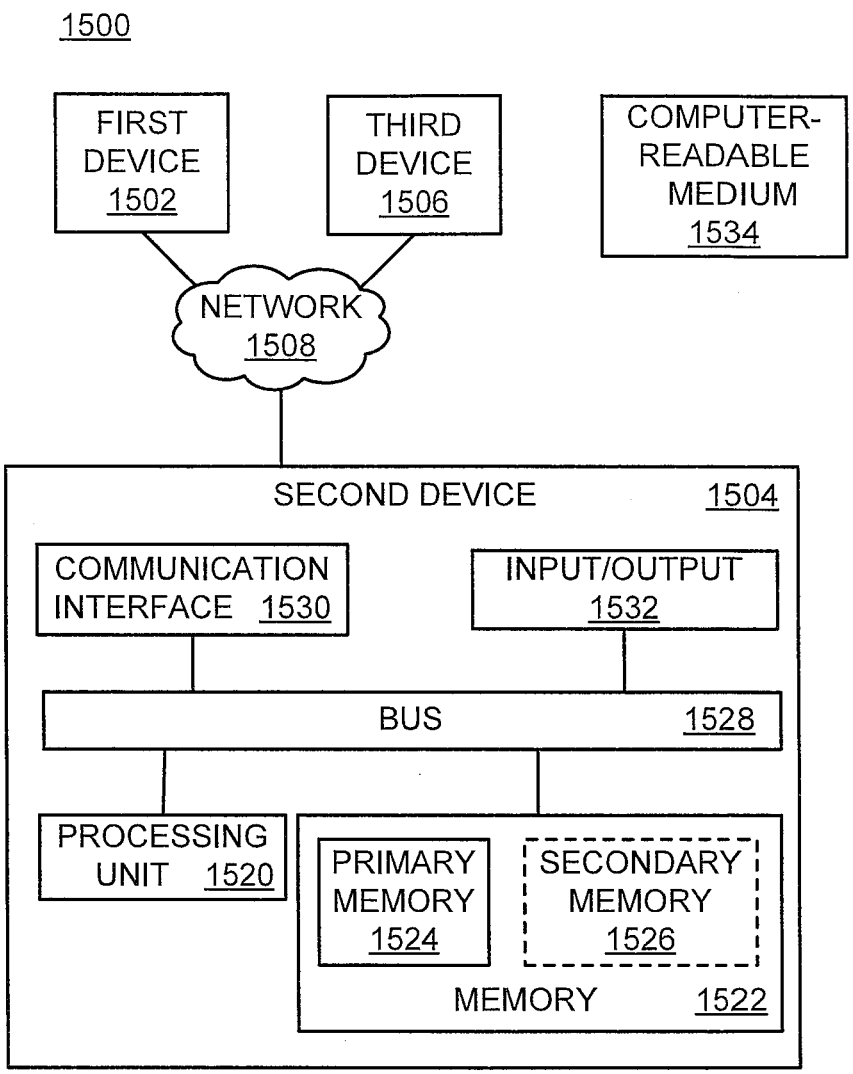
FIG. 15 is a schematic diagram illustrating a system including special purpose computing platforms in accordance with example embodiments.

FIG. 15 is a schematic diagram illustrating a system 1500 including special purpose computing platforms configurable to execute all or a portion of an assessment of UDC and selection of widgets based at least upon the assessment using one or more techniques illustrated above, for example. In a particular example, although claimed subject matter is not limited in this respect, such an assessment and selection may be implemented to process queries or requests that are received from devices coupled to network 1508. System 1500 may include, for example, a first device 1502, a second device 1504 and a third device 1506, which may be operatively coupled together through the network 1508.

In a particular example embodiment, the functionality that was illustrated in the flow diagram of FIG. 2 or that was described with reference to FIG. 14 may be centrally implemented by the processing unit 1520 of the secondary device 1504 by executing instructions stored in the primary memory 1524. According to other embodiments, the functionality illustrated in the flow diagram of FIG. 2 may be distributed across multiple ones of the first, second, and third devices 1502, 1504, and 1506 that are linked by network 1508. These examples are presented for purposes of illustration and not for limitation, thus the claimed subject matter is not so limited.

First device 1502, second device 1504 and third device 1506, as shown in FIG. 15, may be representative of any device, appliance or machine that may be configurable to exchange data over network 1508. By way of example but not limitation, any of first device 1502, second device 1504, or third device 1506 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof.

Similarly, network 1508, as shown in FIG. 15, is representative of one or more communication links, processes, and/or resources configurable to support the exchange of data between at least two of first device 1502, second device 1504, and third device 1506. By way of example but not limitation, network 1508 may include wireless and/or wired communication links, telephone or telecommunications systems, data buses or channels, optical fibers, terrestrial or satellite resources, local area networks, wide area networks, intranets, the Internet, routers or switches, and the like, or any combination thereof.

As illustrated, for example, by the dashed lined box illustrated as being partially obscured of third device 1506, there may be additional like devices operatively coupled to network 1508.

It is recognized that all or part of the various devices and networks shown in system 1500, and the processes and methods as further described herein, may be implemented using or otherwise include hardware, firmware, software, or any combination thereof.

Thus, by way of example but not limitation, second device 1504 may include at least one processing unit 1520 that is operatively coupled to a memory 1522 through a bus 1528.

Processing unit 1520 is representative of one or more circuits configurable to perform at least a portion of a data computing procedure or process. By way of example but not limitation, processing unit 1520 may include one or more processors, controllers, microprocessors, microcontrollers, application specific integrated circuits, digital signal processors, programmable logic devices, field programmable gate arrays, and the like, or any combination thereof.

Memory 1522 is representative of any data storage mechanism. Memory 1522 may include, for example, a primary memory 1524 and/or a secondary memory 1526. Primary memory 1524 may include, for example, a random access memory, read only memory, etc. While illustrated in this example as being separate from processing unit 1520, it should be understood that all or part of primary memory 1524 may be provided within or otherwise co-located/coupled with processing unit 1520.

Secondary memory 1526 may include, for example, the same or similar type of memory as primary memory and/or one or more data storage devices or systems, such as, for example, a disk drive, an optical disc drive, a tape drive, a solid state memory drive, etc. In certain implementations, secondary memory 1526 may be operatively receptive of, or otherwise configurable to couple to, a computer-readable medium 1534. Computer-readable medium 1534 may include, for example, any medium that can carry and/or make accessible data, code and/or instructions for one or more of the devices in system 1500.

Second device 1504 may include, for example, a communication interface 1530 that provides for or otherwise supports the operative coupling of second device 1504 to at least network 1508. By way of example but not limitation, communication interface 1530 may include a network interface device or card, a modem, a router, a switch, a transceiver, and the like.

Second device 1504 may include, for example, an input/output 1532. Input/output 1532 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 1532 may include an operatively configured display, keyboard, mouse, trackball, touch screen, etc.

It should also be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Such software and/or firmware may be expressed as machine-readable instructions which are executable by a processor. Likewise, although the claimed subject matter is not limited in scope in this respect, one embodiment may comprise one or more articles, such as a storage medium or storage media. This storage media, such as one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the detailed description presented above, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the above detailed description were presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated.

For example, one or more portions of a memory device may store signals representative of data and/or information as expressed by a particular state of the memory device. In an implementation, an electronic signal representative of data and/or information may be "stored" in a portion of a memory device by affecting or changing the state of such portions of the memory device to represent data and/or information as binary information (e.g., ones and zeros). As such, in a particular implementation, such a change of state of the portion of memory to store a signal representative of data and/or information constitutes a transformation of a memory device to a different state or thing.

It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the foregoing discussion, it is appreciated that throughout this specification discussions utilizing terms such as "assessing," "processing," "computing," "calculating," "associating," "identifying," "determining," "allocating," "generating," and/or the like refer to the actions and/or processes of a specific apparatus, such as a special purpose computing platform. In the context of this specification, therefore, a special purpose computing platform is capable of manipulating or transforming signals, typically represented as physical electronic or magnetic quantities within memories, registers, or other information storage devices, transmission devices, or display devices of the special purpose computing platform or similar special purpose computing platform.

The terms, "and," "and/or," and "or" as used herein may include a variety of meanings that will depend at least in part upon the context in which it is used. Typically, "and/or" as well as "or" if used to associate a list, such as A, B and/or C, is intended to mean A, B, and C, here used in the inclusive sense, as well as A, B or C, here used in the exclusive sense. Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments. Embodiments described herein may include machines, devices, engines, or apparatuses that operate using digital signals. Such signals may comprise electronic signals, optical signals, electromagnetic signals, or any form of energy that provides information between locations.

While there have been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method comprising:
   assessing, at least partially in response to receiving one or more signals representative of user-defined content, by one or more processors, said user-defined content and storing one or more signals representative of a result of said assessment of said user-defined content, said assessing to determine a user intent of a search query, wherein said user-defined content comprises at least said search query and one or more text messages received by a user or transmitted by the user;
   selecting, at least partially in response to receiving said one or more signals comprising at least said search query, one or more widgets for presentation to a user, in combination with other content associated with said user-defined content, said selecting being based at least in part on said assessment of said user-defined content, wherein individual ones of said one or more widgets comprise an item of a graphical user interface to provide a user with an interaction point capable of receiving a user input relating to a particular topic and presenting an output relating to said user input; and
   tailoring said one or more widgets to specify one or more selections, worksheets, or calculators to be displayed by said one or more widgets based, at least in part, on said user-defined content and in response to said selecting of said one or more widgets.

2. The method of claim 1, wherein one or more items of said user-defined content comprises a second search query submitted by a user to a search engine, said selecting being based at least in part on said assessment of said search query.

3. The method of claim 1, wherein said user-defined content comprises a web page presented to a user in response to an action performed by said user.

4. The method of claim 1, wherein said user-defined content comprises content comprising an email message or a text message.

5. The method of claim 1, wherein selecting said one or more widgets comprises ordering said one or more widgets based at least upon a content relevancy, where the content relevancy of a widget comprises how closely a widget matches a deduced intent of a user's query.

6. The method of claim 5, wherein selecting said one or more widgets additionally comprises ordering said one or more widgets based at least upon a revenue potential of said one or more widgets.

7. The method of claim 6, wherein selecting said one or more widgets additionally comprises ordering said one or more widgets based at least upon a preference of said user.

8. A system comprising a special purpose computing platform, the special purpose computing platform comprising:
   a memory; and
   a processor in communication with the memory, the processor being programmed with instructions executable by said processor to:
      assess user-defined content to determine a user intent of a search query, wherein said user-defined content comprises at least said search query and one or more text messages received by a user or transmitted by the user;
      select, at least partially in response to receiving said one or more signals comprising at least said search query, one or more widgets for presentation to a user, in combination with other content associated with said user-defined content, based at least in part on the assessment of said user-defined content, wherein individual ones of said one or more widgets comprise an item of a graphical user interface to provide a user with an interaction point capable of receiving a user input relating to a particular topic and presenting an output relating to said user input; and
      tailor said one or more widgets to specify one or more selections, worksheets, or calculators to be displayed by said one or more widgets based, at least in part, on said user-defined content and in response to said selecting of said one or more widgets.

9. The system of claim 8, wherein the processor is further programmed with instructions to collect historical data associated with a user.

10. The system of claim 9, wherein the processor is further programmed with instructions to tailor said one or more widgets relative to said user based at least in part upon said historical data.

11. The system of claim 10, wherein said historical data comprises a language preference of said user.

12. The system of claim 10, wherein said historical data further comprises a recent activity log of said user.

13. The system of claim 10, wherein said historical data further comprises a saved search log of said user.

14. The system of claim 10, wherein said historical data further comprises a user profile of said user.

15. An article comprising:
a non-transitory machine-readable medium storing instructions that are executable by a special purpose computing platform to:
assess user-defined content to determine a user intent of a search query, wherein said user-defined content comprises at least said search query and one or more text messages received by a user or transmitted by the user;
select, at least partially in response to receiving said search query, one or more widgets for presentation to a user, in combination with other content associated with said user-defined content, the selecting based at least in part on the assessment of said user-defined content, wherein individual ones of said one or more widgets comprise an item of a graphical user interface to provide a user with an interaction point capable of receiving a user input relating to a particular topic and presenting an output relating to said user input; and
tailor said one or more widgets to specify one or more selections, worksheets, or calculators to be displayed by said one or more widgets based, at least in part, on said user-defined content and in response to said selecting of said one or more widgets.

16. The article of claim 15, wherein said instructions are further executable by said special purpose computing platform to tag a search query submitted by a user with one or more query semantic labels, said selection of said one or more widgets is further based at least in part on said one more query semantic labels.

17. The article of claim 15, wherein said instructions are further executable by said special purpose computing platform to extract subject data from a web page viewed by said user and apply to said subject data one or more auxiliary semantic labels, said selection of said one or more widgets being further based at least in part on said one or more auxiliary semantic labels.

18. The article of claim 15, wherein said instructions are further executable by said special purpose computing platform to authenticate said user with a third-party server that is capable of using authentication information for access to privileged data.

19. The article of claim 15, wherein said selection of said one or more widgets comprises selecting said one or more widgets from a library of pre-defined widgets, wherein the said one or more widgets are selected responsive to a set of pre-defined conditions being met.

20. The article of claim 19, wherein said library of pre-defined widgets comprise one or more of: a utility widget; a shopping widget; a local widget; a finance widget; an entertainment widget; a social widget; or an online game widget.

* * * * *